US008889990B2

(12) United States Patent
Fausz

(10) Patent No.: US 8,889,990 B2
(45) Date of Patent: Nov. 18, 2014

(54) VARIED WIRE INSULATION USING BOTH FOAMED AND UNFOAMED SECTIONS

(75) Inventor: David M. Fausz, Fort Thomas, KY (US)

(73) Assignee: General Cable Technologies Corporation, Highland Heights, KY (US)

( * ) Notice: Subject to any disclaimer, the term of this patent is extended or adjusted under 35 U.S.C. 154(b) by 988 days.

(21) Appl. No.: 12/948,289

(22) Filed: Nov. 17, 2010

(65) Prior Publication Data

US 2011/0117366 A1 May 19, 2011

Related U.S. Application Data

(60) Provisional application No. 61/262,361, filed on Nov. 18, 2009.

(51) Int. Cl.

| | |
|---|---|
| ***H01B 7/00*** | (2006.01) |
| ***B32B 15/00*** | (2006.01) |
| ***H01B 3/44*** | (2006.01) |
| ***H01B 7/18*** | (2006.01) |
| *H01B 11/02* | (2006.01) |

(52) U.S. Cl.

CPC ................ *H01B 7/189* (2013.01); *H01B 3/445* (2013.01); *H01B 3/441* (2013.01); *H01B 11/02* (2013.01)

USPC ....... 174/110 R; 428/375; 428/379; 428/378; 174/113 R; 174/120 R; 174/120 C

(58) Field of Classification Search

None

See application file for complete search history.

(56) References Cited

U.S. PATENT DOCUMENTS

| | | | | |
|---|---|---|---|---|
| 3,365,353 | A | 1/1968 | Witman | |
| 5,192,834 | A * | 3/1993 | Yamanishi et al. | 174/120 SR |
| 6,222,129 | B1 * | 4/2001 | Siekierka et al. | 174/113 R |
| 6,239,377 | B1 * | 5/2001 | Nishikawa | 174/110 R |
| 7,208,682 | B2 * | 4/2007 | Kuchta et al. | 174/110 R |
| 7,473,848 | B2 | 1/2009 | Kenny et al. | |
| 2011/0114362 | A1 * | 5/2011 | Fausz et al. | 174/113 R |

* cited by examiner

*Primary Examiner* — Jill Gray

(74) *Attorney, Agent, or Firm* — Ulmer & Berne LLP

(57) ABSTRACT

The present invention provides a twisted pair of insulated wires that comprises a first wire that has a first insulation. The first insulation includes at least one foamed section and at least one unfoamed section. A second wire has a second insulation. The second insulation includes at least one foamed section and at least one unfoamed section. The at least one foamed section of the first insulation is spaced from and not adjacent to the at least one foamed section of the second insulation.

17 Claims, 2 Drawing Sheets

VARIED WIRE INSULATION USING BOTH FOAMED AND UNFOAMED SECTIONS

RELATED APPLICATION

This application claims priority under 35 U.S.C. §119(e) to U.S. Provisional Application Ser. No. 61/262,361, filed Nov. 18, 2009, the subject matter of which is hereby incorporated by reference.

FIELD OF THE INVENTION

The present invention relates to insulation for twisted wire pairs. More specifically, the insulation of the present invention utilizes foamed and unfoamed sections in patterns that avoid crushing of the insulation at the foamed sections when the wire pairs are twinned.

BACKGROUND OF THE INVENTION

Data cables typically include a core of twisted wire pairs with each individual wire being insulated. When foam insulation is used, crushing often occurs when the wire pairs are twinned or twisted together, which can result in unwanted reduction in conductor-to-conductor spacing. That is because foam is physically weaker in tensile and compressive strength than solid insulation. Also, in current foaming methods, it is often difficult to control foam percentages within the extrusion operation due to a multitude of factors, such as back pressure, melt strength, and catalyst integration. In addition, during normal extrusion processes, such as pressure extrusion, it is not possible to create certain shapes on the insulated conductor. That is because pressure extrusion makes adding channels and shapes very difficult around wires. Solid insulation, however, is typically more expensive and often fails flame testing because it generates much more smoke than foamed materials.

Therefore, a need exists for wire pair insulation that avoids crushing, that is less expensive, and that passes flame testing.

SUMMARY OF THE INVENTION

Accordingly, the present invention provides a twisted pair of insulated wires that comprises a first wire that has a first insulation. The first insulation includes at least one foamed section and at least one unfoamed section. A second wire has a second insulation. The second insulation includes at least one foamed section and at least one unfoamed section. The at least one foamed section of the first insulation may be spaced from and not adjacent to the at least one foamed section of the second insulation.

The present invention also provides a twisted pair of insulated wires that comprises a first wire that has a first insulation. The first insulation includes a plurality of foamed sections and a plurality of unfoamed sections. A second wire has a second insulation. The second insulation includes a plurality of foamed sections and a plurality of unfoamed sections. At least one of the foamed sections of the first insulation may be spaced from and not adjacent to at least one of the foamed sections of the second insulation.

The present invention further provides a pair of insulated wires that comprises a first wire that has a first insulation. The first insulation includes a first pattern of foamed sections and at least one unfoamed section. A second wire has a second insulation. The second insulation includes a second pattern of foamed sections and at least one unfoamed section. The first pattern of foamed sections may be different than the second pattern of foamed sections such that at least one foamed section of the first pattern of foamed sections is spaced from and not adjacent to at least one foamed section of the second pattern of foamed sections.

Other objects, advantages and salient features of the invention will become apparent from the following detailed description, which, taken in conjunction with the annexed drawing, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The present invention generally relates to the insulation on the wires of twisted wire pairs that uses different patterns and/or uneven spacing of foamed and unfoamed sections in the insulation to minimize the chance of a foamed section of the wire insulation crushing another foamed section of the insulation of the other wire during twinning of the wire pairs.

Figure 1:
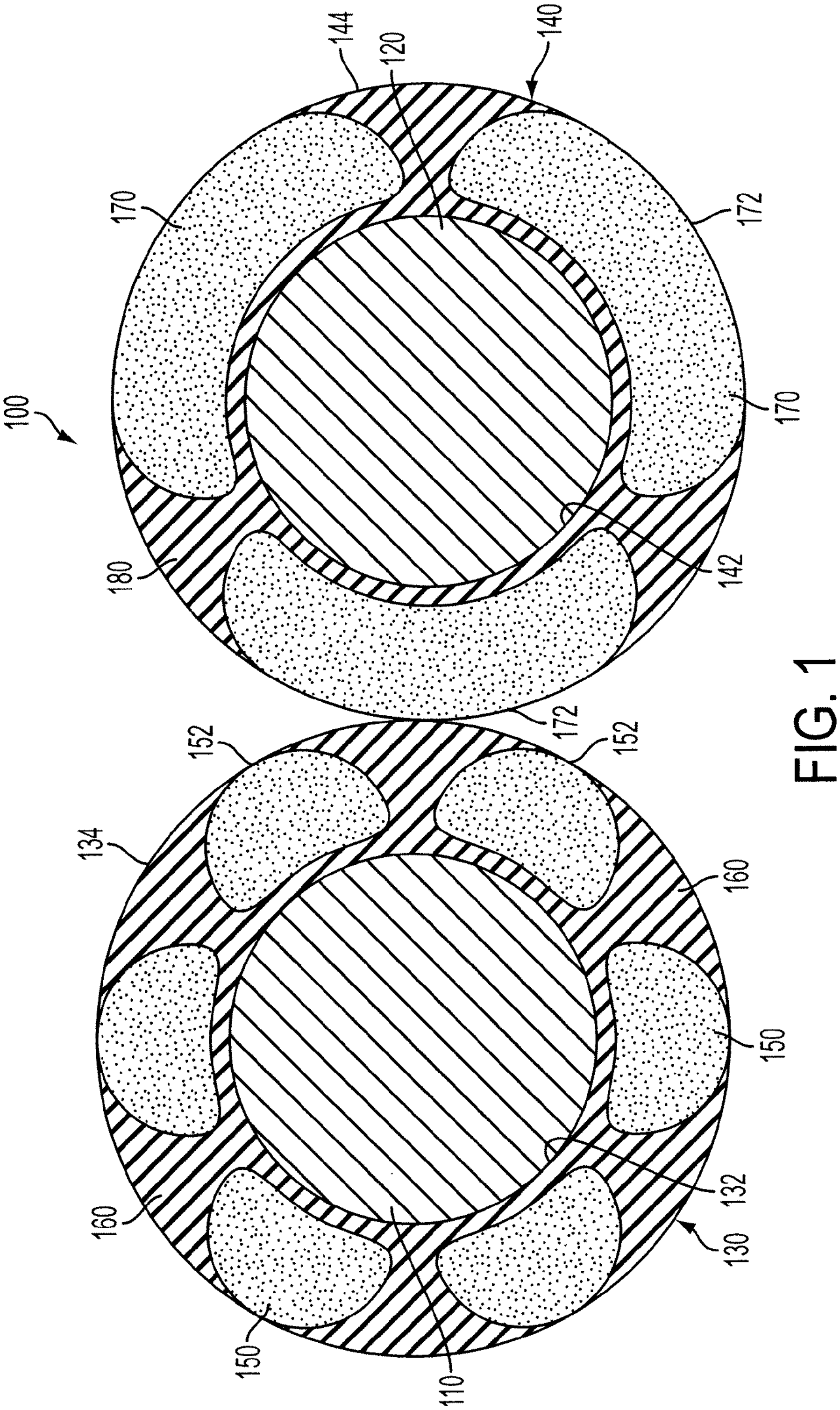
FIG. 1 is a cross-sectional view of one embodiment of a pair of insulated wires in accordance with an exemplary embodiment of the present invention.

FIG. 1 illustrates an exemplary twisted wire pair 100 that includes first and second wires or conductors 110 and 120 in accordance with one embodiment of the present invention. The first and second wires 110 and 120 include first and second insulations 130 and 140, respectively. Both the first and second insulations 130 and 140 have inner surfaces 132 and 142 that abut and cover the wires, and outer surfaces 134 and 144. The first insulation 130 preferably has both foamed and solid (unfoamed) sections 150 and 160. The second insulation 140 likewise has foamed sections 170 and solid sections 180. The foamed sections 150 and 170 may have any shape. For example, the foamed sections 150 of the insulation 130 may have a generally triangular cross-sectional shape, as seen in FIG. 1.

In accordance with the present invention, the foamed and unfoamed sections 150 and 160 of the first insulation 130 preferably have different spacing patterns and sizes than the foamed and unfoamed sections 170 and 180 of the second insulation 140, as seen in FIG. 1. For example, the first insulation 130 may have six smaller foamed sections 150 embedded in a solid section 160 and the second insulation 140 may have three larger foamed sections 170 with solid sections 180 therebetween. That is, each of the foamed sections 150 is substantially smaller than each foamed section 170. As seen in FIG. 1, each foamed section 170 may be at least twice as large as each foamed section 150. Any number of foamed and unfoamed sections may be used for the first insulation 130 and the second insulation 140. By differing the spacing patterns of the foamed and unfoamed sections in the insulations 130 and 140, the chance of the foamed sections 150 and 170 of the insulations 130 and 140, respectively, meeting and crushing each other is minimized.

The foamed sections 150 and 170 of the insulations 130 and 140, respectively, may have portions 152 and 172 exposed at the outer surface 134 and 144 of the insulations. It is preferable that the exposed portions 152 of insulation 130 are spaced from and not adjacent to the exposed portions 172 of insulation 140 to avoid crushing of the insulations 130 and 140 when the wires 110 and 120 are twinned.

The invention contemplates, for example, that if the first insulation 130 has very small foamed and unfoamed sections 150 and 160 and the second insulation 140 has larger foamed and unfoamed sections 170 and 180, a mechanical "buttressing" takes place between the insulations 130 and 140. That is, several small foamed and unfoamed sections of the first insulation 130 may meet with one large foamed or unfoamed section of the second insulation 140. Such arrangement disperses the force that would normally be applied from one large foamed or unfoamed section to another large foamed or unfoamed section, effectively reducing the crushing force on all sections.

The above embodiments may be used together such that different and irregular spacing patterns of the foamed and unfoamed sections are employed resulting in more potential for randomization of the meeting of foamed sections of the first insulation 130 and the second insulation 140. By randomizing and therefore minimizing the intersections of foamed sections from each wire 110 and 120 during the twinning process, the compressive force on the foamed sections is alleviated to reduce crushing.

Figure 2:
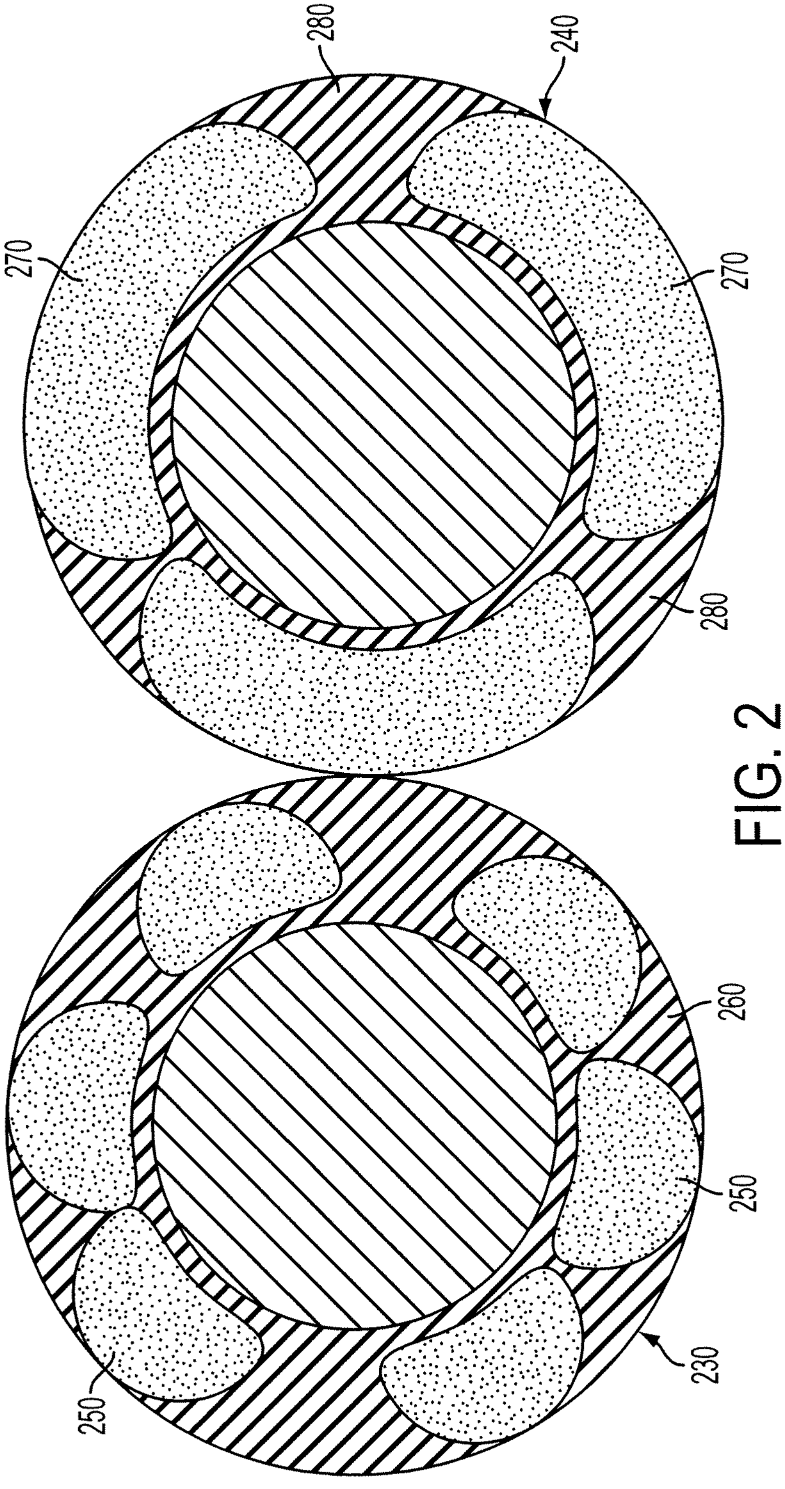
FIG. 2 is a cross-sectional view of another embodiment of a pair of insulated wires in accordance with an exemplary embodiment of the present invention.

In accordance with another exemplary embodiment of the present invention, the first and second insulations 230 and 240 may use irregular spacing of the foamed and unfoamed sections, as seen in FIG. 2, instead of uniform spacing. For example, the foamed sections 250 of the first insulation 230 may be irregularly or non-uniformly spaced in an unfoamed section 260. Similarly, the foamed sections 270 of the second insulation 240 may be irregularly spaced from each other such that the unfoamed sections 280 are also irregularly spaced from one another and are different sizes. The irregular spacing pattern of the foamed and unfoamed sections may be the same or different in the insulation 230 and 240 of the respective wires. That arrangement also reduces the probability that two foamed sections meet and crush each other. This embodiment also serves the purpose of eliminating a pattern of defects or mitigating cyclical defects in the pair insulation because of the lack of a regular spacing of defects.

The materials used to make the foamed sections and the unfoamed sections of the above embodiments may be the same or different. For example, the foamed sections and the unfoamed sections may be formed of fluorinated ethylene propylene (FEP), high density polyethylene (HDPE), perfluoromethylvinylether (MFA), Halar, polyvinyl chloride (PVC), other fluropolymers, resins, such as polystyrene (PS) and ethylene vinyl acetate (EVA) and the like. Moreover, the foamed sections may be foamed either before or after twinning the wires 110 and 120 into a twisted wire pair. For example, the foamed sections may be foamed after twinning the pairs as discussed in co-pending, commonly assigned U.S. patent application Ser. No. 12/948,282, filed on Nov. 17, 2010, and entitled Method of Post-Twinning Dual Solid Foamed Insulation, the subject matter of which is hereby incorporated by reference.

While particular embodiments have been chosen to illustrate the invention, it will be understood by those skilled in the art that various changes and modifications can be made therein without departing from the scope of the invention as defined in the appended claims.

What is claimed is:

1. A pair of insulated wires, comprising:
a first wire having a first insulation, said first insulation including at least one foamed section and at least one unfoamed section; and
a second wire having a second insulation, said second insulation including at least one foamed section and at least one unfoamed section;
wherein said at least one foamed section of said first insulation is spaced from and not adjacent to said at least one foamed section of said second insulation and said at least one foamed section is adjacent to said at least one unfoamed section of said second insulation,
wherein said at least one foamed section of said first insulation is a different shape and size than said at least one foamed section of said second insulation, and
wherein said at least one unfoamed section of said first insulation is a different shape and size than said at least one unfoamed section of said second insulation.

2. A pair of insulated wires according to claim 1, wherein said at least one foamed section of said first insulation is substantially smaller than said at least one foamed section of said second insulation.

3. A pair of insulated wires according to claim 1, wherein said foamed section of said first insulation has a portion exposed at an outer surface of said first insulation; and said foamed section of said second insulation has a portion exposed at an outer surface of said second insulation.

4. A pair of insulated wires according to claim 1, wherein said foamed sections are formed of one of a FEP, HDPE, MFA, Halar, PVC, or fluropolymer.

5. A pair of insulated wires, comprising:
a first wire having a first insulation, said first insulation including a plurality of foamed sections and a plurality of unfoamed sections; and
a second wire having a second insulation, said second insulation including a plurality of foamed sections and a plurality of unfoamed sections;
wherein at least one of said foamed sections of said first insulation is spaced from and not adjacent to at least one of said foamed sections of said second insulation and said at least one foamed section is adjacent to at least one of said unlearned sections of said second insulation,
wherein said at least one foamed section of said first insulation is a different shape and size than said at least one foamed section of said second insulation, and
wherein at least one of said unfoamed sections of said first insulation is a different shape and size than said at least one unfoamed section of said second insulation.

6. A pair of insulated wires cording to claim 5, wherein each of said foamed sections of said second insulation is at least twice as large as said foamed sections of said first insulation.

7. A pair of insulated wires according to claim 5, wherein a pattern of said plurality of foamed sections of said first insulation is different than a pattern of said plurality of foamed sections of said second insulation.

8. A pair of insulated wires according to claim 7, wherein the pattern of said plurality of foamed sections of said first insulation is irregular.

9. A pair of insulated wires according to claim 5, wherein said foamed sections of said first insulation have a portion exposed at an outer surface of said first insulation; and said foamed sections of said second insulation have a portion exposed at an outer surface of said second insulation.

10. A pair of insulated wires according to claim 5, wherein at least one of said foamed sections of said second insulation is larger than at least one said foamed sections of said first insulation.

11. A pair of insulated wires according to claim 5, wherein said foamed sections are formed of one of a FEP, HDPE, MFA, Halar, PVC, or fluropolymer.

12. A pair of insulated wires, comprising:

a first wire having a first insulation, said first insulation including a first pattern of foamed sections and at least one unfoamed section; and a second wire having a second insulation, said second insulation including a second pattern of foamed sections and at least one unfoamed section, wherein said first pattern of foamed sections is different than said second pattern of foamed sections such that at least one foamed section of said first pattern of foamed sections is spaced from and not adjacent to at least one foamed section of said second pattern of foamed sections and said at least one foamed section of said first pattern of foamed sections is adjacent to said at least one unfoamed section of said second insulation, wherein said at least one foamed section of said first pattern of foamed sections is a different shape and size than said at least one foamed section of said second pattern of foamed sections, and wherein at least one of said unfoamed section of said first insulation is a different shape and size than said at least one unfoamed section of said second insulation.

13. A pair of insulated wires according to claim 12, wherein each of said foamed sections of said first insulation is substantially smaller than each of said foamed sections of said second insulation.

14. A pair of insulated wires according to claim 12, wherein each of said foamed sections of said first pattern is a different shape than said foamed sections of said second pattern.

15. A pair of insulated wires according to claim 12, wherein said foamed sections of said first pattern are uniformly spaced.

16. A pair of insulated wires according to claim 12, wherein said foamed sections of said first pattern are irregularly spaced.

17. A pair of insulated wires according to claim 12, wherein said first pattern includes at least twice as many foamed sections as said second pattern.

* * * * *

UNITED STATES PATENT AND TRADEMARK OFFICE

CERTIFICATE OF CORRECTION

PATENT NO. : 8,889,990 B2
APPLICATION NO. : 12/948289
DATED : November 18, 2014
INVENTOR(S) : David M. Fausz It is certified that error appears in the above-identified patent and that said Letters Patent is hereby corrected as shown below:

In the Claims,

Claim 5, column 4, line 43, change “unlearned” to --unfoamed--; and
Claim 10, column 5, line 3, change “one said” to --one of said--.

Signed and Sealed this
Twenty-fourth Day of March, 2015

Michelle K. Lee
*Director of the United States Patent and Trademark Office*